United States Patent
Dreibholz et al.

(10) Patent No.: US 6,905,439 B2
(45) Date of Patent: Jun. 14, 2005

(54) METHOD FOR CONTROLLING AND REGULATING A DRIVE TRAIN

(75) Inventors: Ralf Dreibholz, Meckenbeuren (DE); Detlef Baasch, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/450,083

(22) PCT Filed: Jan. 14, 2002

(86) PCT No.: PCT/EP02/00255

§ 371 (c)(1),
(2), (4) Date: Jun. 9, 2003

(87) PCT Pub. No.: WO02/057109

PCT Pub. Date: Jul. 25, 2002

(65) Prior Publication Data

US 2004/0082436 A1 Apr. 29, 2004

(30) Foreign Application Priority Data

Jan. 17, 2001 (DE) ......................... 101 01 861

(51) Int. Cl.$^7$ ............................ B60K 41/02; F16H 3/08
(52) U.S. Cl. .......................... 477/174; 74/329
(58) Field of Search ................. 74/329, 335, 336 R, 74/337; 477/107, 109, 174–6

(56) References Cited

U.S. PATENT DOCUMENTS

| | | | | |
|---|---|---|---|---|
| 3,412,625 A | 11/1968 | Oldberg et al. | ................ | 74/368 |
| 4,361,060 A | * 11/1982 | Smyth | ......................... | 477/78 |
| 4,544,057 A | * 10/1985 | Webster et al. | ............. | 477/176 |
| 4,616,521 A | 10/1986 | Akashi et al. | ................ | 74/335 |
| 4,622,866 A | 11/1986 | Ito et al. | ........................ | 74/866 |
| 4,627,312 A | * 12/1986 | Fujieda et al. | ............ | 74/336 R |
| 4,860,607 A | 8/1989 | Numazawa et al. | .......... | 74/330 |
| 5,390,562 A | * 2/1995 | Sherman | ...................... | 74/335 |
| 6,105,743 A | 8/2000 | Salecker et al. | ........... | 192/84.6 |
| 6,604,438 B2 | * 8/2003 | Harst et al. | ................... | 74/335 |

FOREIGN PATENT DOCUMENTS

| | | | | |
|---|---|---|---|---|
| DE | 195 04 847 A1 | 9/1995 | ........... | B60K/23/00 |
| DE | 197 35 759 A1 | 2/1999 | ........... | B60K/41/22 |
| DE | 198 56 326 A1 | 6/2000 | ........... | F16H/63/40 |
| DE | 199 08 602 A1 | 9/2000 | ........... | B60K/41/22 |
| DE | 199 16 655 A1 | 11/2000 | ........... | B60K/26/00 |
| GB | 2 117 068 A | 10/1983 | ............. | F16H/5/60 |
| JP | 58065327 | 4/1986 | ........... | F16D/11/10 |
| JP | 08109950 | 4/1996 | ............. | F16H/3/10 |

* cited by examiner

Primary Examiner—Roger Pang
(74) Attorney, Agent, or Firm—Davis & Bujold, P.L.L.C.

(57) ABSTRACT

Disclosed is a method for controlling and regulating the drive train of a vehicle, comprising a drive unit, a transmission and an output unit. The transmission has controllable free-wheel units corresponding with pairs of toothed wheels for disengaging or engaging an old or a new gear and a clutch mounted on the output side. In the presence of a shift command for carrying out a higher traction shift, the transmission capacity of the clutch is adjusted in a manner such that a current drive torque of the drive unit applied to said clutch is transmitted to the output unit and the clutch exhibits at least an approximately slip-free state. When a higher traction shift exists, an operative connection is suddenly created between a controllable free-wheel unit and a corresponding pair of toothed wheels of the new gear, and the operative connection of the old gear is at least almost simultaneously canceled.

16 Claims, 2 Drawing Sheets

METHOD FOR CONTROLLING AND REGULATING A DRIVE TRAIN

FIELD OF THE INVENTION

The invention relates to a method for controlling and regulating a drive train of a vehicle with one drive unit, one transmission and one output unit.

BACKGROUND OF THE INVENTION

In DE 197 35 759 has been described a method for control of an automatic driving device which has one propulsion source, one speed-change transmission with several toothed wheel sets that can be coupled, one fluid-actuatable main clutch and fluid-actuatable switch means for activating the individual toothed wheel sets. In addition, one electronic control is provided for the control of the main clutch and of the switch means, the main clutch being held in slipping state or attaining a change-over of the switch means free of traction interruptions. For shifting the forward gears one draw key is provided respectively on a transmission input shaft and on a transmission output shaft as coupling element or switch means respectively actuated by a hydraulic adjusting element for changing over the reduction steps or forward gears. At the same time, two loose toothed wheels respectively on the transmission input shaft and on the transmission output shaft can each be coupled with two fixed toothed wheels respectively on the transmission input shaft and the transmission output shaft.

The transmission input shaft has a central hole into which is movably passed one tappet which carries a draw key as form-locking coupling element. The draw key here protrudes a radial slot in the input shaft and interacts with longitudinal grooves in the toothed wheels. The length of the radial slot allows an axial displacement of the draw key via the tappet from a first position in which the draw key couples with positive fit a first toothed wheel with the transmission input shaft, to a medium idling position in which the draw key produces no connection with positive fit between the transmission input shaft and a toothed wheel and to a third position in which one other toothed wheel of a new ratio step is coupled with positive fit with the transmission input shaft.

To attain a low-wear complete shift of the draw key from one toothed wheel to the other toothed wheel, the cross-section of the opening of a throttle valve of the internal combustion engine is reduced for a brief time in the shifting torque independently of an accelerator pedal input in order to reduce the input torque of the internal combustion engine to the range of from milliseconds to tenths of seconds.

However, this known method for control of an automatic driving device has the disadvantage that during a higher traction shift under load, the draw key or the shifting element has to be disengaged from the toothed wheel for which strong shifting forces are needed. To reduce said shifting forces, it has been proposed to reduce to the switch torque the drive torque of the internal combustion engine. But due to said procedure, the drive train of a motor vehicle is completely discharged for a long period of time, which results in an undesirable traction interruption.

Therefore, the problem on which this invention is based is to make a method available for control and regulation of a drive train by means of which a high traction shift can be carried out quickly and without interruption of traction with great shifting comfort.

SUMMARY OF THE INVENTION

The inventive method for control and regulation of a drive train of a vehicle, in which an older gear or a new gear can be disconnected or connected via controllable free-wheel units corresponding with toothed wheel pairs of the transmission, advantageously makes it possible to omit a discharge of the drive train thus preventing an interruption of traction during a higher traction shift.

This advantage results from the fact that the new gear or the operative connection between a controllable free-wheel unit and a toothed wheel pair of the new gear is suddenly engaged, an old currently introduced gear or the operative connection between a controllable free-wheel unit associated with the old gear and a pair of toothed wheels that form the ratio step of the old gear being at least approximately simultaneously canceled. As result of this procedure a power flow in the drive train advantageously is not interrupted during the gear shift itself and a traction interruption is prevented in a simple way.

Of further advantage is that during the gear shift operation, the vibrations appearing in the drive train and torque super-elevations are not transmitted by the clutch located on the output side to the output unit, since a transmission capacity of the clutch in the presence of a shift command for carrying out a higher traction shift, is adjusted in a manner such that a current drive torque of the output unit applied to the clutch is transmitted to the output unit and that the clutch at the same time is at least almost in slip-free state.

Said adjustment of the transmission capacity of the clutch results in that an acceleration torque produced by the sudden engagement of the new gear leads to a pulling apart of the clutch located on the output side and to an increase of the input rotational speed of the clutch, the torque leap on the output unit being limited by the clutch now slipping. With this mode of operation a definite improvement is obtained in the torque behavior on the output unit during the sudden coupling of the rotary masses of the transmission during the switching in or engagement of the operative connection of the new gear between a controllable free-wheel unit and a toothed wheel pair corresponding therewith.

These advantages of the inventive method that have been described produce altogether a substantially increased comfort during shifting with a reduction of the load of the parts disposed in the drive train on the output side of the clutch.

BRIEF DESCRIPTION OF THE DRAWINGS

The invention will now be described, by way of example, with reference to the accompanying drawings in which.

DETAILED DESCRIPTION OF THE INVENTION

Figure 1:
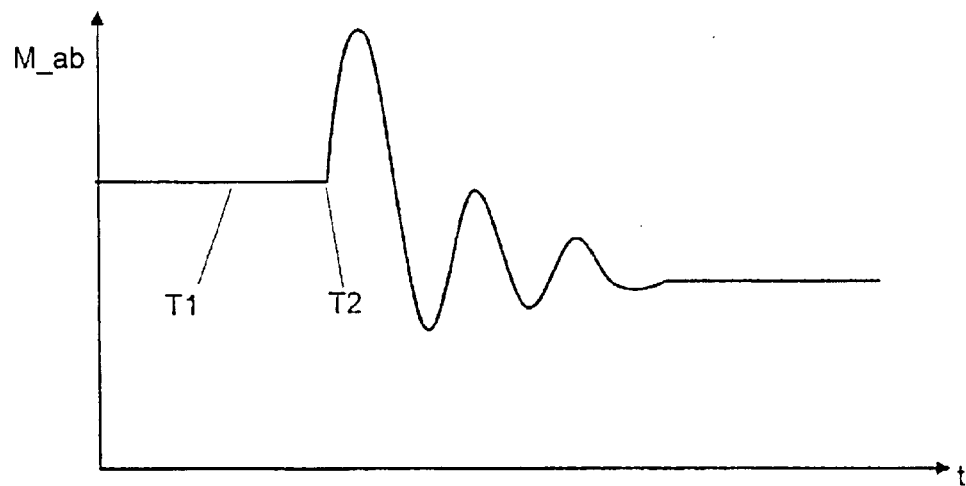
FIG. 1 shows a schematized curve of an output torque during a shifting cycle without motor engagement.
Figure 2:
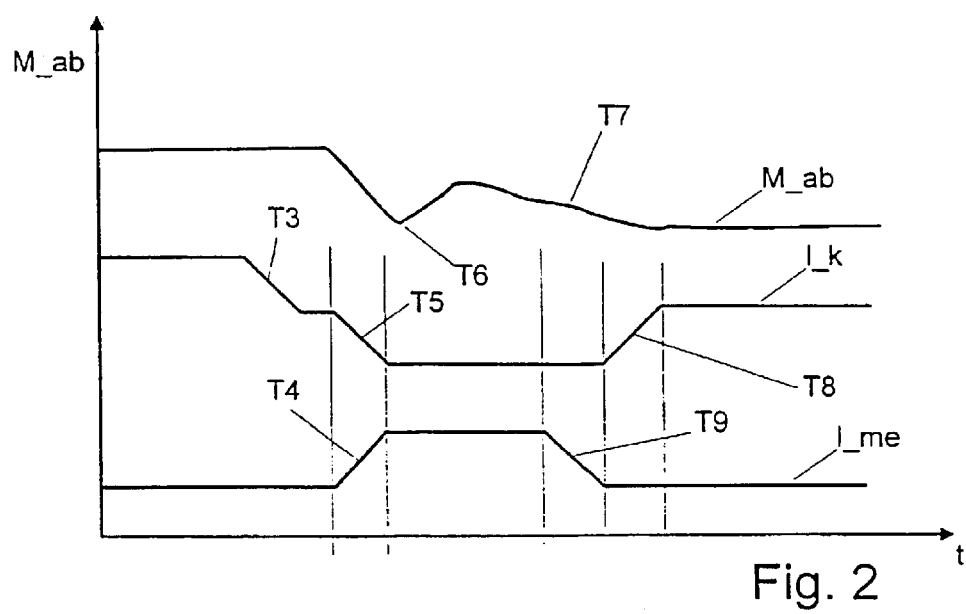
FIG. 2 shows a schematized curve of an output torque during a gear shift operation and curves corresponding therewith of a clutch actuation, the same as of a motor engagement.

With reference to the curves shown in FIG. 1 and FIG. 2 of an output torque M_ab during a shift cycle of a higher traction shift, the mode of operation of the inventive method for control and regulation of a drive train of a vehicle and the special action of an arrangement of the clutch on the transmission output side are indicated whereas in FIG. 2, unlike in FIG. 1, is reproduced the curve when the inventive method is used.

FIG. 1 shows the curve of a torque M_ab on an output unit of an output train of a vehicle when changing from an old gear to a new gear during a higher traction shift like it would develop without using the inventive method. The shown curve of the output torque M_ab is here carried out without reduction of an input torque of a drive unit of the drive train, a clutch of the drive train being situated on the output side of the transmission.

The output torque M_ab or the curve thereof is illustrated in the course of time and in a first range T1 where, in a transmission of the drive train a current ratio of an old gear is adjusted, it has a value at least almost constant. At a point T2, where the output torque M_ab steeply rises, a ratio of a new gear is suddenly adjusted, which results in an acceleration of the output unit and a rise of the output torque M_ab. As the time t increases, the vibration in the drive train generated by the engagement of the new gear is dampened until a value of the output torque M_ab equivalent to the ratio of the new gear is adjusted.

Figure 3:
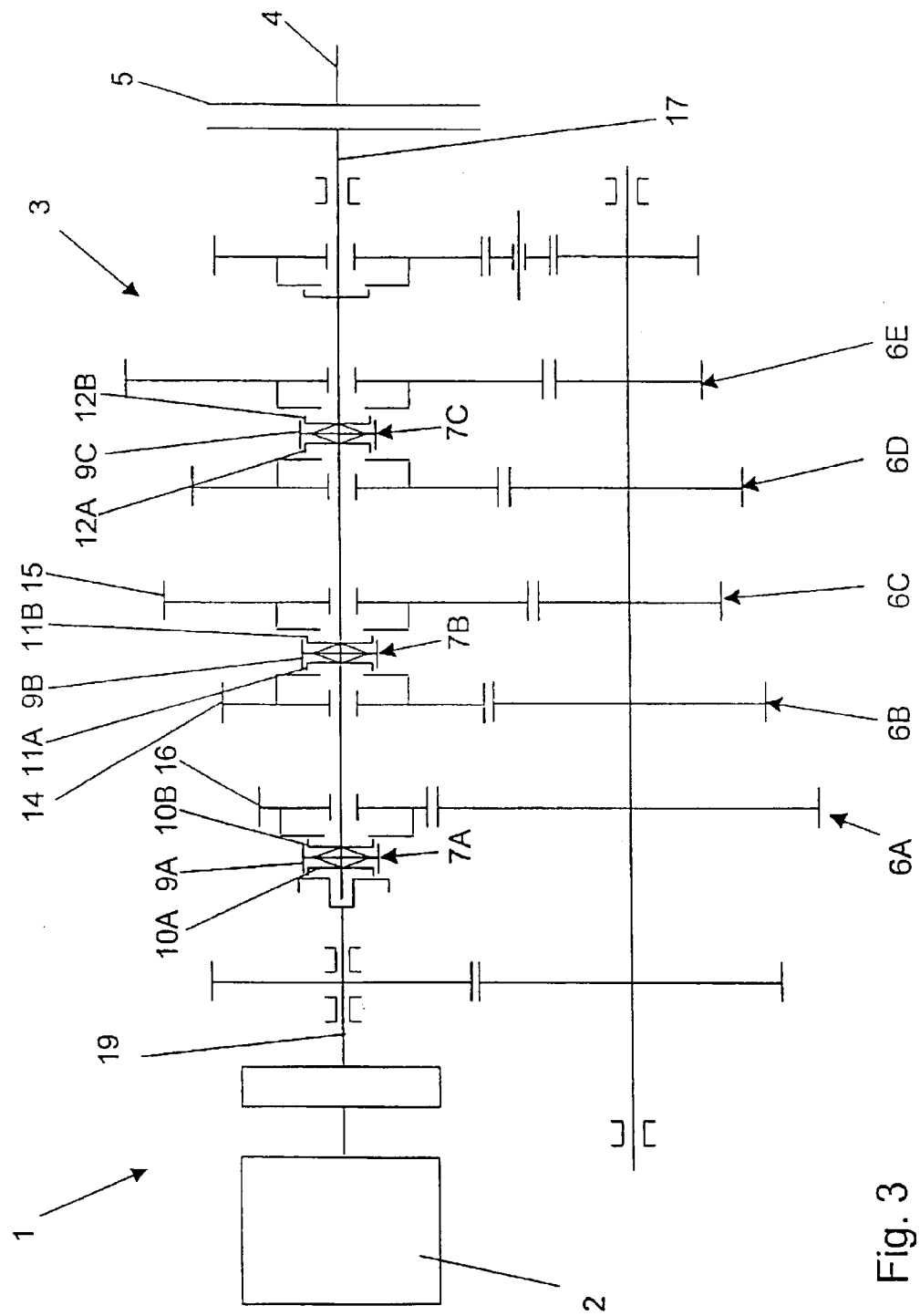
FIG. 3 shows a schematized representation of a drive train with a wheel diagram of a transmission situated in the drive train, a power dividing shift element being located upon an output side of a transmission.

The curve of the output torque M_ab during a gear shift operation shown in FIG. 2 is adjusted when using the inventive method in a drive train 1 diagrammatically shown in FIG. 3 whose transmission 3 has controllable free-wheel units 7A to 7C corresponding with toothed wheel pairs 6A to 6E for disconnecting or connecting an old or a new gear and a clutch 5 situated on the output side. Each free-wheel unit 7A to 7C is designed with a gearshift sleeve 9A, 9B, 9C and clutch pulleys 10A, 10B, 11A, 11B, 12A, 12B each situated between two loose wheels 14, 15, 16 of the toothed wheel pairs 6A to 6E and the gearshift sleeves 9A, 9B, 9C.

Depending on an axial position of the gearshift sleeves 9A, 9B, 9C movably guided in axial direction of the transmission 3, it is possible, via the free-wheel units 7A to 7C in the drive train 1, to guide traction torques and/or traction and pushing torques from the drive unit 2, via the transmission 3 or a transmission input shaft 19 and a transmission output shaft 17, to the output unit 4.

Examining the curves in FIG. 2, it can be seen that when a shifting signal for carrying out a higher traction shift appears, a transmission capacity of the clutch 5, which is reproduced with a line 1_k, in a first phase T3 of the curve 1_k of the clutch actuation, is first adjusted in a manner such that a current input torque of the drive unit 2 applied thereon is directly transmitted to the output unit with a slight slip or a slip-free state of the clutch 5.

Subsequently, in a shift preparatory phase, the input torque or motor torque of the drive unit 2 is slopingly reduced down to zero or a maximum push torque in a first phase T4 of a motor engagement, the curve of which is shown with reference to a line 1_me. During this time interval, within which the input torque is reduced, the torque existing in the drive train 1 drops only with delay due to the elasticities and rotary mass effects of the drive train 1. In the same time, the transmission capacity of the clutch 5 is reduced, according to a second range T5 of the curve of the clutch actuation, to a value corresponding to the required retaining torque of the new gear after shifting, the new torque to be transmitted by the clutch 5 being equal to the old torque multiplied by a ratio of the reduction of the new gear and a ratio of the old gear.

Prior to engagement of the new gear, an operative connection between a respective free-wheel unit of the free-wheel; units 7A to 7C and a toothed wheel pair of an old gear corresponding thereto is controlled so that traction torques applied thereby are transmitted and when a push torque is applied the operative connection of the old gear is canceled.

The sudden engagement of the new gear takes place, according to FIG. 2, prior to reaching a minimum T6 of the curve of the output torque M_ab. The operative connection between the free-wheel unit and the toothed wheel pair of the new gear corresponding therewith is created at the same time. Due to the engagement of the new gear, the input rotational speed of the clutch rises and the output torque M_ab again increases, the clutch 5 being brought to a slip state by the acceleration torque applied to the clutch 5 and the torque applied on the output side of the clutch is only partly guided via the clutch 5 to the output unit 4. As a result of the slip state of the clutch 5, the vibrations produced during the shifting operation in the drive train 1 are not transmitted to the output unit 4, since the clutch 5 extensively dampens them or does not transmit them at all, which represents an enormous advantage compared to a clutch situated on the input side of the transmission.

After the increase of the output torque M_ab, the output torque M_ab, corresponding to a second range T7 or the curve of the output torque M_ab, runs counter to a value of the output torque M_ab equivalent to a ratio of the new gear. A rotational speed of the drive unit 2, preferably constructed as Otto motor or Diesel motor, diminishes here as a result of the braking effect of the motor engagement and of the slip torque acting in the clutch 5.

For this purpose, the free-wheel units 7A to 7C of the transmission 3 are constructionally developed so that they can transmit applied traction and push torques according to their control, the free-wheel units associated with an old gear during a gear shift, particularly a higher traction shift, being controlled so as only to transmit applied traction torques and that during a torque reversal from a traction torque to a push torque, the operative connection between a free-wheel; unit and a corresponding toothed wheel pair be quickly and spontaneously canceled. Such a torque reversal occurs during a higher traction shift due to the engagement of the new gear and with a sudden engagement of the new gear the operative connection of the old gear is simultaneously or immediately canceled.

It can be conveniently provided that a toothed wheel pair corresponding with the free-wheel unit or a part situated on the toothed wheel pair through which the operative connection of a gear is created, has a flashing device or flashing flank which during an applied push torque suddenly leads the free-wheel unit to disengagement from the toothed wheel pair.

With this development of the free-wheel units 7A to 7C and of the toothed wheel pairs 6A to 6E corresponding therewith and the operative connection that can be formed between said parts, a spontaneous or sudden change from a ratio of an old gear to a ratio of a new gear can be carried out in the drive train 1 with exceeding quickness and under full load.

After engagement of the new gear, the transmission capacity of the clutch 5 is increased according to a range T8, shown in FIG. 2, of the curve 1_k of the clutch actuation so that a differential rotational speed in the clutch 5 is guided in direction of a synchronous rotational speed. Starting from a threshold value of the differential rotational speed of the clutch 5, according to a shown second section T9 of the curve 1_me of the motor engagement, the drive torque of the drive unit 2 is again slopingly increased to the value prior to the engagement.

After a certain slip phase, if the clutch 5 has reached its synchronous rotational speed, the transmission capacity thereof is adjusted to a maximum value.

Alternatively to this it can be provided that when the synchronous rotational speed exists in the clutch 5, the transmission capacity of the clutch be adjusted via a slip regulation in order, to filter out vibrations and resonances in the drive train 1, via the slipping clutch 5, thus increasing the comfort in driving.

The transmission capacity of the clutch 5 can be adjusted by mechanical or also hydraulic devices, which are controlled in this case by an electronic control unit (not shown in detail), which is connected by signal technology with the drive train 1.

What is claimed is:

1. A method for controlling and regulating a drive train (1) of a vehicle, comprising a drive unit (2), a transmission (3) and an output unit (4) wherein the transmission (3) has a plurality of controllable free-wheel units (7A to 7C) corresponding with a plurality of toothed wheel pairs (6A to 6E) for disconnecting or connecting an old or a new gear, the method comprising the steps of:

adjusting a transmission capacity of a single clutch (5) located on an output side between the transmission (3) and the output unit (4) in the presence of a shift command for carrying out a higher traction shift, so that a current drive torque of the drive train (2) applied to the clutch is transmitted to the output unit (4) and the clutch (5) is in a slight slip state so that vibrations generated during the shift is not transmitted through the single clutch (5) to the output unit (4);

suddenly creating an operative connection, during the higher traction shift, between one of the plurality of controllable free-wheel units and one of the plurality of toothed wheel pairs of the new gear corresponding therewith; and canceling the operative connection of the old gear concurrently with the creation of the operative connection.

2. The method according to claim 1, further comprising the step of reducing, in the presence of a shift command, an input torque of the drive unit (2) prior to engaging the new gear in a manner such that an output torque (M_ab) corresponding to the new gear to be introduced adjusts in the output unit (4).

3. The method according to claim 1, further comprising the step of controlling an operative connection between the plurality of controllable free-wheel units and one of the plurality of toothed wheel pairs of an old gear corresponding therewith so that high traction torques applied thereby are transmitted, the operative connection of the old gear being canceled when a push torque is applied.

4. The method according to claim 2, further comprising the step of controlling an operative connection between the plurality of controllable free-wheel units and one of the plurality of toothed wheel pairs of an old gear corresponding therewith so that high traction torques applied thereby are transmitted, the operative connection of the old gear being canceled when a push torque is applied.

5. The method according to claim 1, further comprising the step of regulating the transmission capacity of the clutch during the whole shifting operation (5) so that the clutch converts to a slip state upon engagement of the new gear.

6. The method according to claim 3, further comprising the step of regulating the transmission capacity of the clutch during the whole shifting operation (5) so that the clutch converts to a slip state upon engagement of the new gear.

7. The method according to claim 4, further comprising the step of regulating the transmission capacity of the clutch during the whole shifting operation (5) so that the clutch converts to a slip state upon engagement of the new gear.

8. The method according to claim 1, further comprising the step of increasing the transmission capacity of the clutch (5) after shifting, so that a differential rotational speed in the clutch (5) is guided in a direction of a synchronous rotational speed.

9. The method according to claim 2, further comprising the step of increasing the transmission capacity of the clutch (5) after shifting, so that a differential rotational speed in the clutch (5) is guided in a direction of a synchronous rotational speed.

10. The method according to claim 3, further comprising the step of increasing the transmission capacity of the clutch (5) after shifting, so that a differential rotational speed in the clutch (5) is guided in a direction of a synchronous rotational speed.

11. The method according to claim 4, further comprising the step of increasing the transmission capacity of the clutch (5) after shifting, so that a differential rotational speed in the clutch (5) is guided in a direction of a synchronous rotational speed.

12. The method according to claim 5, further comprising the step of increasing the transmission capacity of the clutch (5) after shifting, so that a differential rotational speed in the clutch (5) is guided in a direction of a synchronous rotational speed.

13. The method according to claim 12, further comprising the step of increasing, the drive torque of the drive unit (2) starting from a threshold value of the differential rotational speed of the clutch (5).

14. The method according to claim 12, further comprising a step of adjusting the transmission capacity of the clutch (5) to a maximum value in the presence of the synchronous rotational speed in the clutch (5).

15. The method according to claim 12, further comprising the step of adjusting the transmission capacity of the clutch (5) via a slip regulation, in the presence of the synchronous rotational speed in said clutch (5).

16. The method according to claim 2, further comprising the step of regulating the transmission capacity of the clutch during the whole shifting operation (5) so that the clutch converts to a slip state upon engagement of the new gear.

* * * * *